United States Patent
Kodera et al.

(10) Patent No.: US 12,049,263 B2
(45) Date of Patent: Jul. 30, 2024

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Takashi Kodera, Okazaki (JP); Yusuke Kakimoto, Okazaki (JP); Toru Takashima, Susono (JP); Hidetsugu Toyama, Susono (JP)

(73) Assignees: JTEKT CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 247 days.

(21) Appl. No.: 17/861,619

(22) Filed: Jul. 11, 2022

(65) Prior Publication Data
US 2023/0026554 A1    Jan. 26, 2023

(30) Foreign Application Priority Data
Jul. 13, 2021    (JP) .................... 2021-115588

(51) Int. Cl.
*B62D 5/04*    (2006.01)
*B62D 6/00*    (2006.01)

(52) U.S. Cl.
CPC ........... *B62D 5/0463* (2013.01); *B62D 6/002* (2013.01); *B62D 6/008* (2013.01)

(58) Field of Classification Search
CPC ....... B62D 5/0463; B62D 6/002; B62D 6/008
See application file for complete search history.

(56) References Cited

U.S. PATENT DOCUMENTS

| | | | | |
|---|---|---|---|---|
| 7,974,752 B2* | 7/2011 | Yamashita | ........... | B62D 5/0463 701/41 |
| 2009/0037054 A1* | 2/2009 | Igarashi | ................ | B62D 5/008 701/42 |
| 2018/0181130 A1* | 6/2018 | Inoue | ................... | B62D 15/025 |
| 2018/0222524 A1* | 8/2018 | Talamonti | ............. | B62D 6/008 |
| 2019/0152520 A1* | 5/2019 | Obermüller | ........... | B62D 5/008 |
| 2019/0233004 A1* | 8/2019 | Kodera | ................... | B62D 3/12 |
| 2019/0367074 A1* | 12/2019 | Engels | ................... | B62D 5/006 |
| 2020/0062294 A1* | 2/2020 | Kodera | ................. | B62D 5/008 |

FOREIGN PATENT DOCUMENTS

| | | |
|---|---|---|
| EP | 3521137 A1 | 8/2019 |
| EP | 3978338 A1 | 4/2022 |
| JP | 2003-002223 A | 1/2003 |
| JP | 2020-192908 A | 12/2020 |

OTHER PUBLICATIONS

Nov. 29, 2022 Search Report issued in European Patent Application No. 22184053.1.

* cited by examiner

*Primary Examiner* — Hussein Elchanti
(74) *Attorney, Agent, or Firm* — Oliff PLC

(57) ABSTRACT

A steering control device includes a control unit configured to perform a calculation based on angle information and to control the operation of a turning section based on a turning control amount. The angle information is obtained by relating the turning control amount for operating the turning section to a steering angle that is an angle by which a steering wheel is steered. The control unit includes a speed increase ratio calculation unit configured to calculate a speed increase ratio based on state variables, and an angle information calculation unit configured to calculate the angle information by converting the steering angle using the speed increase ratio obtained by the speed increase ratio calculation unit.

5 Claims, 7 Drawing Sheets

STEERING CONTROL DEVICE

CROSS-REFERENCE TO RELATED APPLICATION

This application claims priority to Japanese Patent Application No. 2021-115588 filed on Jul. 13, 2021, incorporated herein by reference in its entirety.

BACKGROUND

1. Technical Field

The present disclosure relates to a steering control device.

2. Description of Related Art

A vehicle is equipped with a steering device having, for example, a steering section that enables steering of a steering wheel of the vehicle and a turning section that enables turning of turning wheels of the vehicle. As one example, Japanese Unexamined Patent Application Publication No. 2020-192908 (JP 2020-192908 A) discloses a steer-by-wire steering device having a structure with a power transmission path cut off between the steering section and the turning section.

JP 2020-192908 A discloses controlling the operation of the turning section using a target turning angle that is obtained by correcting a steering angle that is an angle by which a steering wheel is steered and that is detected as a state of the steering section. Here, the correction of the steering angle involves varying a ratio of a turning angle that is an angle of the turning wheels to the steering angle.

SUMMARY

In the correction of the steering angle described above, the relationship between the steering angle and the turning angle is varied by varying the ratio of the turning angle that is the angle of the turning wheels to the steering angle using a turning ratio gain that is obtained by performing a map-based calculation according to a vehicle speed. Such a method of varying the relationship between the steering angle and the turning angle is not limited to using the turning ratio gain, and there is still room for proposing other methods that are more useful.

One aspect of this disclosure is a steering control device. The steering control device controls, as a control target, at least a turning section of a steering device including a steering section that enables steering of a steering wheel of a vehicle and the turning section that has a structure with a power transmission path cut off between the turning section and the steering section and operates to turn a turning wheel of the vehicle. The steering control device includes a control unit configured to perform a calculation based on angle information and to control the operation of the turning section based on a turning control amount. The angle information is obtained by relating the turning control amount for operating the turning section to a steering angle that is an angle by which the steering wheel is steered. The control unit includes a speed increase ratio calculation unit configured to calculate a speed increase ratio based on state variables, and an angle information calculation unit configured to calculate the angle information by converting the steering angle using the speed increase ratio obtained by the speed increase ratio calculation unit. The speed increase ratio represents a ratio of a change amount of a turning angle that is an angle of the turning wheel to a change amount of the steering angle. The state variables change according to an operation state of at least either the steering device or the vehicle equipped with the steering device.

According to this configuration, the speed increase ratio is calculated based on the state variables that change according to the operation state of at least either the steering device or the vehicle equipped with the steering device, so that a change in the operation state appears as a change in the speed increase ratio. Thus, the speed increase ratio can be used as an index when calculating the turning control amount to obtain an appropriate turning control amount according to the operation state. Further, when reflecting information about the turning angle as a state of the turning section in controlling the steering section, the speed increase ratio obtained by the speed increase ratio calculation unit can be applied by, for example, turning it into a reciprocal. In this case, reflecting the state of the turning section in controlling the steering section does not require separately providing a calculation unit, such as a speed increase ratio calculation unit that converts information about the turning angle. Therefore, the capacity of a memory that is set in relation to the control unit can be kept down. Thus, as a method of varying the relationship between the steering angle and the turning angle, a useful method using the speed increase ratio that is the ratio of the change amount of the turning angle to the change amount of the steering angle can be proposed.

For example, when the steering angle is converted so as to increase the speed as a result of using the speed increase ratio as in the above configuration, in the yaw rate response characteristics that are the vehicle's behavior, a peak that appears transiently also increases as the responsiveness becomes higher according to the amount of speed increase. Trying to keep down such a transiently appearing peak results in narrowing the range usable as the speed increase ratio.

In the steering control device, the angle information calculation unit may include a static component calculation unit and a compensation calculation unit. The static component calculation unit may be configured to calculate a static component as a result of converting the steering angle using the speed increase ratio. The static component may be a component reflecting a steady-state characteristic among yaw rate response characteristics that are the vehicle's behavior relating to the angle information. The compensation calculation unit may be configured to calculate the angle information by performing phase compensation based on the state variables on the static component so as to adjust a transient characteristic among the yaw rate response characteristics that appears in relation to calculation of the static component. The state variables may include at least the state variable that the speed increase ratio calculation unit uses for calculation.

According to this configuration, the yaw rate response characteristics can be adjusted so as to keep the transiently appearing peak down, without narrowing the range that can be used as the speed increase ratio.

In the steering control device, the static component calculation unit may be configured to calculate the static component using an amount of speed increase in the speed increase ratio. The amount of speed increase may be a difference from a reference value that is one as a ratio of a change amount of a turning angle that is an angle of the turning wheel to a change amount of the steering angle. The compensation calculation unit may be configured as a phase lag filter that, to perform phase lag compensation, has a transfer function that changes based on the state variables including at least the state variable that the speed increase ratio calculation unit uses for calculation. The control unit may be configured to calculate the turning control amount based on a result obtained by adding up the steering angle and the angle information obtained by the phase lag filter.

According to this configuration, even when the steering angle is converted so as to increase the speed as a result of using the speed increase ratio, the impact is restricted to the amount of speed increase of the speed increase ratio. In this case, even when phase compensation is performed while a transient characteristic among the yaw rate response characteristics that the vehicle originally has remains, the transiently appearing peak in the yaw rate response characteristics can be favorably kept down.

In the steering control device, the static component calculation unit may be configured to calculate the static component using the speed increase ratio. The compensation calculation unit may be configured as a phase compensation filter that, to perform phase compensation, has a transfer function that changes based on the state variables including at least the state variable that the speed increase ratio calculation unit uses for calculation. The phase compensation filter may be configured so as to include an inverse function obtained by switching a denominator and a numerator of a transfer function representing a transient characteristic among the yaw rate response characteristics. The control unit may be configured to calculate the turning control amount based on the angle information obtained by the phase compensation filter.

According to this configuration, when the steering angle is converted so as to increase the speed as a result of using the speed increase ratio, the impact reaches the value of the speed increase ratio. In this case, phase compensation can be performed while a transient characteristic among the yaw rate response characteristics that the vehicle originally has is canceled. Thus, even when the steering angle is converted using the speed increase ratio, the transiently appearing peak in the yaw rate response characteristics can be favorably kept down.

In the steering control device, the compensation calculation unit may be configured to further include a phase lag filter that, to perform phase lag compensation of reducing noise that appears in a different context from a transient characteristic among the yaw rate response characteristics that appears in relation to calculation of the static component, has a transfer function that changes based on the state variables including at least the state variable that the speed increase ratio calculation unit uses for calculation.

According to this configuration, noise that appears in a different context from an increase in the transiently appearing peak in the yaw rate response characteristics can be reduced. This is effective for securing stability in controlling the operation of the turning section.

According to the steering control device of the present disclosure, a more useful method can be proposed as a method of varying the relationship between the steering angle and the turning angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
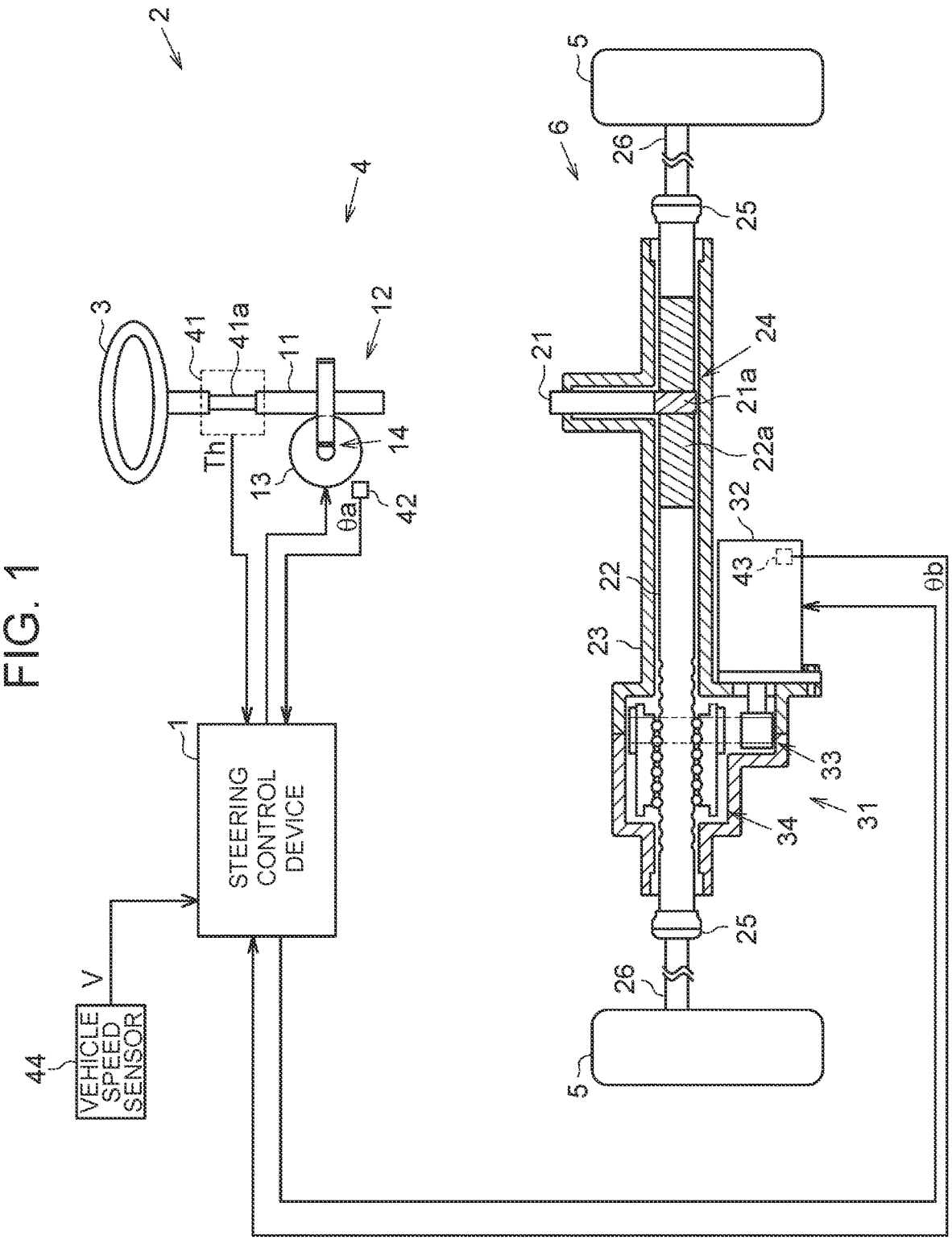
FIG. 1 is a schematic configuration diagram of a steering device.

A first embodiment of a steering control device will be described below in accordance with the drawings. As shown in FIG. 1, a steering device 2 of this embodiment is a steering device of a steer-by-wire vehicle. The steering device 2 includes a steering control device 1 that controls the operation of the steering device 2. The steering device 2 includes a steering section 4 and a turning section 6. The steering section 4 is steered by a driver through a steering wheel 3 of the vehicle. The turning section 6 turns left and right turning wheels 5 of the vehicle according to steering input into the steering section 4 by the driver. The steering device 2 of this embodiment has a structure with a power transmission path between the steering section 4 and the turning section 6 mechanically cut off at all times. This means that the steering device 2 has a structure with a power transmission path between a steering actuator 12, to be described later, and a turning actuator 31, to be described later, mechanically cut off at all times.

The steering section 4 includes a steering shaft 11 and the steering actuator 12. The steering shaft 11 is coupled to the steering wheel 3. The steering actuator 12 has a steering-side motor 13 that is a drive source and a steering-side speed reduction mechanism 14. The steering-side motor 13 is a reaction motor that applies a steering reaction force, which is a force resisting steering, to the steering wheel 3 through the steering shaft 11. The steering-side motor 13 is coupled to the steering shaft 11 through the steering-side speed reduction mechanism 14 that is formed by, for example, a worm and wheel. As the steering-side motor 13 of this embodiment, for example, a three-phase brushless motor is adopted.

The turning section 6 includes a pinion shaft 21, a rack shaft 22 as a turning shaft, and a rack housing 23. The pinion shaft 21 and the rack shaft 22 are coupled to each other at a predetermined intersection angle. Pinion teeth 21a formed on the pinion shaft 21 and rack teeth 22a formed on the rack shaft 22 are meshed with each other to form a rack-and-pinion mechanism 24. Thus, the pinion shaft 21 corresponds to a rotating shaft of which the rotation angle can be converted into a turning angle of the turning wheels 5. The rack housing 23 houses the rack-and-pinion mechanism 24. One end of the pinion shaft 21 on the opposite side from a side coupled to the rack shaft 22 protrudes from the rack housing 23. Both ends of the rack shaft 22 protrude from both ends, in an axial direction, of the rack housing 23. A tie rod 26 is coupled to each end of the rack shaft 22 through a rack end 25 formed by a ball joint. Leading ends of the tie rods 26 are coupled to knuckles (not shown) on which the left and right turning wheels 5 are respectively mounted.

The turning section 6 includes the turning actuator 31. The turning actuator 31 includes a turning-side motor 32 that is a drive source, a transmission mechanism 33, and a conversion mechanism 34. The turning-side motor 32 applies a turning force that turns the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts the rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted.

In the steering device 2 thus configured, the turning angle of the turning wheels 5 is changed as a motor torque is applied as the turning force from the turning actuator 31 to the rack shaft 22 according to steering operation by the driver. Meanwhile, a steering reaction force resisting the steering of the driver is applied from the steering actuator 12 to the steering wheel 3. Thus, in the steering device 2, a steering torque Th required to steer the steering wheel 3 is changed by the steering reaction force that is a motor torque applied from the steering actuator 12.

The reason for providing the pinion shaft 21 is to support the rack shaft 22 inside the rack housing 23 along with the pinion shaft 21. Specifically, by a support mechanism (not shown) provided in the steering device 2, the rack shaft 22 is supported so as to be movable along the axial direction thereof and is pressed toward the pinion shaft 21. Thus, the rack shaft 22 is supported inside the rack housing 23. Alternatively, other support mechanism that supports the rack shaft 22 on the rack housing 23 without using the pinion shaft 21 may be provided.

Electrical Configuration of Steering Device 2

As shown in FIG. 1, the steering-side motor 13 and the turning-side motor 32 are connected to the steering control device 1. The steering control device 1 controls the operation of the steering-side motor 13 and the turning-side motor 32.

A torque sensor 41, a steering-side rotation angle sensor 42, a turning-side rotation angle sensor 43, and a vehicle speed sensor 44 are connected to the steering control device 1. The torque sensor 41 detects the steering torque Th that is a value showing a torque applied to the steering shaft 11 by steering operation of the driver. The torque sensor 41 is provided at a portion of the steering shaft 11, on the side of the steering wheel 3 relative to the steering-side speed reduction mechanism 14. The torque sensor 41 detects the steering torque Th based on twisting of a torsion bar 41a that is provided at an intermediate point of the steering shaft 11. The steering torque Th is detected, for example, as a positive value when the vehicle is steered rightward and as a negative value when the vehicle is steered leftward.

The steering-side rotation angle sensor 42 detects a rotation angle $\theta a$ that is the angle of a rotating shaft of the steering-side motor 13 within a 360-degree range. The steering-side rotation angle sensor 42 is provided on the steering-side motor 13. The rotation angle $\theta a$ of the steering-side motor 13 is used to calculate a steering angle $\theta s$. The steering-side motor 13 and the steering shaft 11 operate in conjunction with each other through the steering-side speed reduction mechanism 14. Thus, there is a correlation between the rotation angle $\theta a$ of the steering-side motor 13 and the rotation angle of the steering shaft 11, as well as, by extension, the steering angle $\theta s$ that is the rotation angle of the steering wheel 3. Accordingly, the steering angle $\theta s$ can be obtained based on the rotation angle $\theta a$ of the steering-side motor 13. The rotation angle $\theta a$ is detected, for example, as a positive value when the vehicle is steered rightward and as a negative value when the vehicle is steered leftward. In this embodiment, the steering angle $\theta s$ is one example of state variables that change according to the operation state of the steering device 2.

The turning-side rotation angle sensor 43 detects a rotation angle $\theta b$ that is the angle of a rotating shaft of the turning-side motor 32 within a 360-degree range. The turning-side rotation angle sensor 43 is provided on the turning-side motor 32. The rotation angle $\theta b$ of the turning-side motor 32 is used to calculate a pinion angle $\theta p$. The turning-side motor 32 and the pinion shaft 21 operate in conjunction with each other through the transmission mechanism 33, the conversion mechanism 34, and the rack-and-pinion mechanism 24. Thus, there is a correlation between the rotation angle $\theta b$ of the turning-side motor 32 and the pinion angle $\theta p$ that is the rotation angle of the pinion shaft 21. Accordingly, the pinion angle $\theta p$ can be obtained based on the rotation angle $\theta b$ of the turning-side motor 32. The pinion shaft 21 is meshed with the rack shaft 22. Therefore, there is also a correlation between the pinion angle $\theta p$ and the amount of movement of the rack shaft 22. Thus, the pinion angle $\theta p$ is a value reflecting the turning angle of the turning wheels 5. The rotation angle $\theta b$ is detected, for example, as a positive value when the vehicle is steered rightward and as a negative value when the vehicle is steered leftward.

The vehicle speed sensor 44 detects a vehicle speed V that is set as information showing a travel speed of the vehicle. The vehicle speed sensor 44 may be connected to a vehicle-side control device that is installed in the vehicle as a control device separate from the steering control device 1. In this case, the vehicle speed V is input from this vehicle-side control device into the steering control device 1 through an on-board network, such as a CAN (not shown). In this embodiment, the vehicle speed V is one example of state variables that change according to the operation state of the vehicle.

Functions of Steering Control Device 1

The steering control device 1 includes a central processing unit (CPU) and a memory that are not shown, and the CPU executes programs stored in the memory on a cycle of a predetermined calculation period. Thus, various processes are executed.

Figure 2:
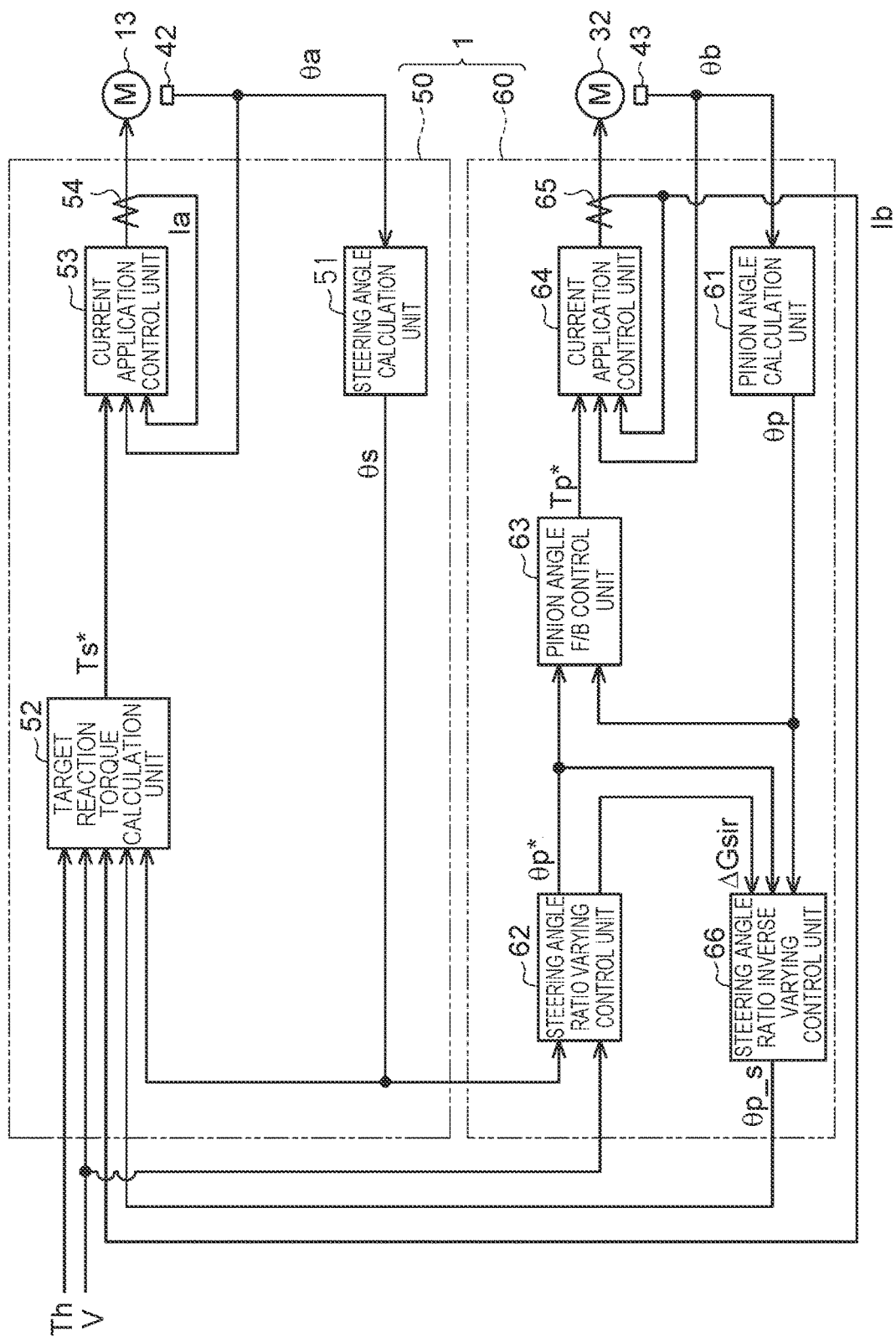
FIG. 2 is a block diagram showing functions of a steering control device.

FIG. 2 shows some of the processes executed by the steering control device 1. The processes shown in FIG. 2 are some of the processes that are realized as the CPU executes the programs stored in the memory, and are depicted according to the type of process to be realized.

The steering control device 1 includes a steering-side control unit 50 that controls the supply of electricity to the steering-side motor 13. The steering-side control unit 50 has a steering-side current sensor 54. The steering-side current sensor 54 detects a steering-side actual current value Ia that is obtained from a value of a current in each phase of the steering-side motor 13 flowing through a connection line between the steering-side control unit 50 and a motor coil of each phase of the steering-side motor 13. The steering-side current sensor 54 acquires, as a current, a voltage drop of a shunt resistor connected to a source side of each switching element in an inverter (not shown) that is provided so as to correspond to the steering-side motor 13. In FIG. 2, for the convenience of description, the connection lines of the respective phases and the current sensors of the respective phases are collectively shown as one connection line and one current sensor.

The steering control device 1 incudes a turning-side control unit 60 that controls the supply of electricity to the turning-side motor 32. The turning-side control unit 60 has a turning-side current sensor 65. The turning-side current sensor 65 detects a turning-side actual current value Ib that is obtained from a value of a current in each phase of the turning-side motor 32 flowing through a connection line between the turning-side control unit 60 and a motor coil of each phase of the turning-side motor 32. The turning-side current sensor 65 acquires, as a current, a voltage drop of a shunt resistor connected to a source side of each switching element in an inverter (not shown) that is provided so as to correspond to the turning-side motor 32. In FIG. 2, for the convenience of description, the connection lines of the respective phases and the current sensors of the respective phases are collectively shown as one connection line and one current sensor. In this embodiment, the turning-side control unit 60 is one example of the control unit that controls the turning section 6 of the steering device 2 as a control target.

Steering-Side Control Unit 50

As shown in FIG. 2, the steering torque Th, the vehicle speed V, the rotation angle $\theta a$, the turning-side actual current value Ib, and a turning-converted angle $\theta p\_s$, to be described later, are input into the steering-side control unit 50. The steering-side control unit 50 controls the supply of electricity to the steering-side motor 13 based on the steering torque Th, the vehicle speed V, the rotation angle $\theta a$, the turning-side actual current value Ib, and the turning-converted angle $\theta p\_s$. The pinion angle $\theta p$ is calculated based on the rotation angle $\theta b$ of the turning-side motor 32. The turning-converted angle $\theta p\_s$ is calculated based on the pinion angle $\theta p$, i.e., the rotation angle $\theta b$, or a target pinion angle $\theta p^*$ to be described later.

The steering-side control unit 50 has a steering angle calculation unit 51, a target reaction torque calculation unit 52, and a current application control unit 53. The rotation angle $\theta a$ is input into the steering angle calculation unit 51. The steering angle calculation unit 51 converts the rotation angle $\theta a$ into an integrated angle including a range exceeding 360° by counting the number of rotations of the steering-side motor 13 from a steering neutral position that is the position of the steering wheel 3 when the vehicle is traveling straight forward. The steering angle calculation unit 51 calculates the steering angle $\theta s$ by multiplying the integrated angle obtained by conversion by a conversion factor based on a rotation speed ratio of the steering-side speed reduction mechanism 14. The steering angle $\theta s$ thus obtained is output to the target reaction torque calculation unit 52 and the turning-side control unit 60.

The steering torque Th, the vehicle speed V, the turning-side actual current value Ib, the turning-converted angle $\theta p\_s$, to be described later, and the steering angle $\theta s$ are input into the target reaction torque calculation unit 52. The target reaction torque calculation unit 52 calculates a target reaction torque command value Ts* based on the steering torque Th, the vehicle speed V, the turning-side actual current value Ib, the turning-converted angle $\theta p\_s$, and the steering angle $\theta s$. The target reaction torque command value Ts* is a reaction force control amount serving as a target for the steering reaction force of the steering wheel 3 to be generated through the steering-side motor 13. The target reaction torque command value Ts* thus obtained is output to the current application control unit 53.

The target reaction torque command value Ts*, the rotation angle $\theta a$, and the steering-side actual current value Ia are input into the current application control unit 53. The current application control unit 53 calculates a current command value Ia* for the steering-side motor 13 based on the target reaction torque command value Ts*. Then, the current application control unit 53 obtains a deviation, from the current command value Ia*, of a current value on a dq coordinate system that is obtained by converting the steering-side actual current value Ia detected through the steering-side current sensor 54 based on the rotation angle $\theta a$, and controls the supply of electricity to the steering-side motor 13 so as to eliminate this deviation. As a result, the steering-side motor 13 generates a torque according to the target reaction torque command value Ts*. Thus, the driver can feel a moderate resistance to steering according to the road reaction force.

Turning-Side Control Unit 60

As shown in FIG. 2, the vehicle speed V, the rotation angle $\theta b$, and the steering angle $\theta s$ are input into the turning-side control unit 60. The turning-side control unit 60 controls the supply of electricity to the turning-side motor 32 based on the vehicle speed V, the rotation angle $\theta b$, and the steering angle $\theta s$.

The turning-side control unit 60 has a pinion angle calculation unit 61, a steering angle ratio varying control unit 62, a pinion angle feedback control unit ("PINION ANGLE FB CONTROL UNIT" in the drawing) 63, a current application control unit 64, and a steering angle ratio inverse varying control unit 66.

The rotation angle $\theta b$ is input into the pinion angle calculation unit 61. The pinion angle calculation unit 61 converts the rotation angle $\theta b$ into an integrated angle including a range exceeding 360° by, for example, counting the number of rotations of the turning-side motor 32 from a rack neutral position that is the position of the rack shaft 22 when the vehicle is traveling straight forward. The pinion angle calculation unit 61 calculates the pinion angle $\theta p$ that is the actual rotation angle of the pinion shaft 21 by multiplying the integrated angle obtained by conversion by a conversion factor based on a rotation speed ratio of the transmission mechanism 33, a lead of the conversion mechanism 34, and a rotation speed ratio of the rack-and-pinion mechanism 24. The pinion angle $\theta p$ thus obtained is output to the pinion angle feedback control unit 63 and the steering angle ratio inverse varying control unit 66.

The vehicle speed V and the steering angle $\theta s$ are input into the steering angle ratio varying control unit 62. Based on the vehicle speed V and the steering angle $\theta s$, the steering angle ratio varying control unit 62 calculates the target pinion angle $\theta p^*$ as a turning control amount serving as a target for the pinion angle $\theta p$ obtained as a result of turning the turning wheels 5. The target pinion angle $\theta p^*$ thus obtained is output to the pinion angle feedback control unit 63 and the steering angle ratio inverse varying control unit 66.

The steering angle ratio varying control unit 62 has a function of calculating a speed increase ratio Gsir, to be described later, as a variable used for a predetermined calculation that is performed in the process of obtaining the target pinion angle $\theta p^*$. The target pinion angle $\theta p^*$ is subjected to, as the predetermined calculation, a calculation for performing scale conversion that turns the target pinion angle θp* into a state variable based on the pinion angle θp. The speed increase ratio Gsir will be described in detail later. The speed increase ratio Gsir obtained in the process of obtaining the target pinion angle θp* is used for calculations as a speed increase value ΔGsir corresponding to a difference that is a value obtained by subtracting a reference value "1" from the speed increase ratio Gsir. The speed increase value ΔGsir thus obtained is output to the steering angle ratio inverse varying control unit 66.

The target pinion angle θp* and the pinion angle θp are input into the pinion angle feedback control unit 63. The pinion angle feedback control unit 63 calculates a turning force command value Tp* as a control amount serving as a target for the turning force through feedback control of the pinion angle θp so as to adapt the pinion angle θp to the target pinion angle θp*. The turning force command value Tp* thus obtained is output to the current application control unit 64.

The turning force command value Tp*, the turning angle θb, and the turning-side actual current value Ib are input into the current application control unit 64. The current application control unit 64 calculates a current command value Ib* for the turning-side motor 32 based on the turning force command value Tp*. Then, the current application control unit 64 obtains a deviation, from the current command value Ib*, of a current value on a dq coordinate system that is obtained by converting the turning-side actual current value Ib detected through the turning-side current sensor 65 based on the rotation angle θb, and controls the supply of electricity o the turning-side motor 32 so as to eliminate this deviation. As a result, the turning-side motor 32 rotates by an angle according to the turning force command value Tp*.

The pinion angle θp, the target pinion angle θp*, and the speed increase value ΔGsir are input into the steering angle ratio inverse varying control unit 66. The steering angle ratio inverse varying control unit 66 calculates the turning-converted angle θp_s based on the pinion angle θp, the target pinion angle θp*, and the speed increase value ΔGsir. The turning-converted angle θp_s is subjected to, as a predetermined calculation, a calculation for performing scale conversion that turns the turning-converted angle θp_s into a state variable based on the steering angle θs. The turning-converted angle θp_s thus obtained is output to the steering-side control unit 50, i.e., the target reaction torque calculation unit 52.

Steering Angle Ratio Varying Control Unit 62

Figure 3:
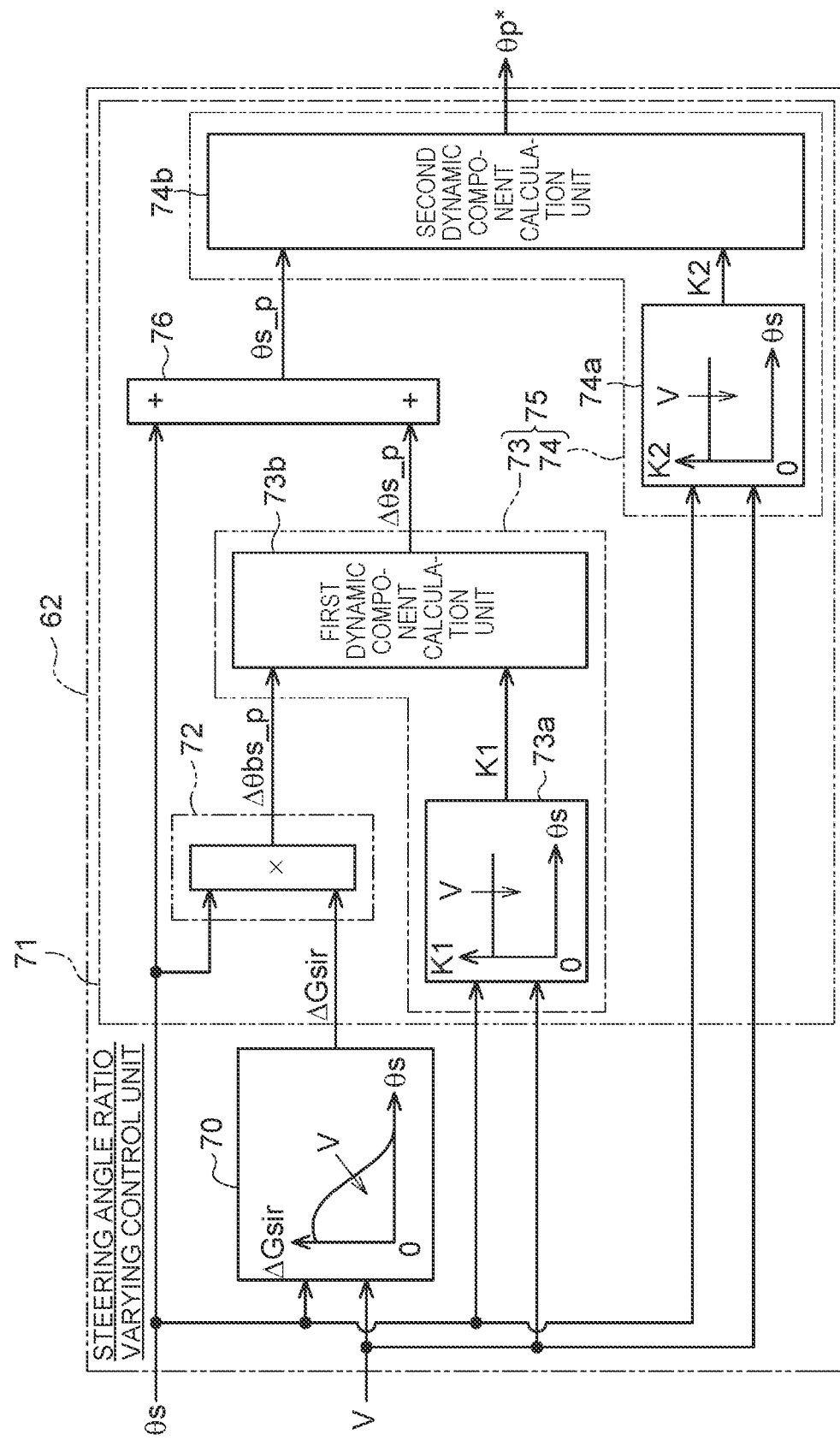
FIG. 3 is a block diagram showing functions of a steering angle ratio varying control unit for a first embodiment.

As shown in FIG. 3, the steering angle ratio varying control unit 62 has a speed increase ratio calculation unit 70 and an angle information calculation unit 71.

The vehicle speed V and the steering angle θs are input into the speed increase ratio calculation unit 70. The speed increase ratio calculation unit 70 includes a speed increase ratio map that defines the relationship of the vehicle speed V and the steering angle θs with the speed increase value ΔGsir. The speed increase ratio calculation unit 70 calculates the speed increase value ΔGsir based on the map using the vehicle speed V and the steering angle θs as inputs. The speed increase ratio map is set, for example, such that the value becomes smaller as the steering angle θs becomes larger and that the value becomes smaller as the vehicle speed V becomes higher. In this embodiment, the speed increase ratio Gsir, which is also expressed as a transmission ratio, a steering angle ratio, a gear ratio, etc., is specified as an index representing a ratio of a change amount of the pinion angle θp to a change amount of the steering angle θs between the steering angle θs and the pinion angle θp. Thus, the speed increase ratio Gsir corresponds to a value obtained with a denominator being the steering angle θs and a numerator being the pinion angle θp, i.e., the target pinion angle θp*. Based on a case where the ratio of the change amount of the pinion angle θp, i.e., the target pinion angle θp* to the change amount of the steering angle θs is "1," the speed increase value ΔGsir is specified as a value obtained by subtracting "1" from the speed increase ratio Gsir. In this embodiment, the speed increase value ΔGsir is set to be equal to or larger than a zero value, i.e., the speed increase ratio Gsir is set to be equal to or larger than one. However, the speed increase value ΔGsir may be set as a negative value, i.e., the speed increase ratio Gsir may be set to be smaller than one. The speed increase value ΔGsir thus obtained is output to the angle information calculation unit 71.

The vehicle speed V, the steering angle θs, and the speed increase value ΔGsir are input into the angle information calculation unit 71. The angle information calculation unit 71 calculates the target pinion angle θp* based on the vehicle speed V, the steering angle θs, and the speed increase value ΔGsir.

Specifically, the angle information calculation unit 71 has a static component calculation unit 72, and a compensation calculation unit 75 including a first compensation calculation unit 73 and a second compensation calculation unit 74. The steering angle θs and the speed increase value ΔGsir are input into the static component calculation unit 72. The static component calculation unit 72 is configured as a multiplier and calculates a converted additional angle Δθbs_p by multiplying the steering angle θs by the speed increase value ΔGsir. The converted additional angle Δθbs_p is a change amount that is an amount of addition reflecting the speed increase ratio Gsir. This change amount is a static component that is a component reflecting a steady-state characteristic among yaw rate response characteristics that is the vehicle's behavior as a result of reflecting the speed increase ratio Gsir. The converted additional angle Δθbs_p thus obtained is output to the first compensation calculation unit 73.

The vehicle speed V, the steering angle θs, and the converted additional angle Δθbs_p are input into the first compensation calculation unit 73. The first compensation calculation unit 73 calculates a final converted additional angle Δθs_p based on the vehicle speed V, the steering angle θs, and the converted additional angle Δθbs_p.

Specifically, the first compensation calculation unit 73 has a first constant calculation unit 73a and a first dynamic component calculation unit 73b. The vehicle speed V and the steering angle θs are input into the first constant calculation unit 73a. The vehicle speed V and the steering angle θs that are state variables input here are the same as the state variables that are input into the speed increase ratio calculation unit 70. The first constant calculation unit 73a includes a first constant map defining the relationship of the vehicle speed V and the steering angle θs with a first constant K1. The first constant calculation unit 73a calculates the first constant K1 based on the map using the vehicle speed V and the steering angle θs as inputs. The first constant map is set, for example, such that the value remains constant relative to the steering angle θs and that the value becomes smaller as the vehicle speed V becomes higher. For the first dynamic component calculation unit 73b that realizes filtering for adjusting a frequency characteristic as phase compensation, the first constant K1 is a value showing a constant of a transfer function that is the characteristics of the filtering. Specifically, the first constant K1 is a cutoff frequency of the transfer function for specifying the frequency used as a target in the filtering, and corresponds to a filter constant that is set when a discrete control system is implemented as the first dynamic component calculation unit 73b. The first constant K1 thus obtained is output to the first dynamic component calculation unit 73b.

The converted additional angle Δθbs_p and the first constant K1 are input into the first dynamic component calculation unit 73b. The first dynamic component calculation unit 73b calculates the final converted additional angle Δθs_p based on the converted additional angle Δθbs_p and the first constant K1. In this embodiment, the first dynamic component calculation unit 73b is formed as a phase lag filter, for example, a low-pass filter, that has a transfer function of a zero-order/first-order, i.e., first-order lag. With the pass frequency set to, for example, a frequency band of a few hertz according to the first constant K1, the first dynamic component calculation unit 73b makes an adjustment to reduce the absolute value of a so-called yaw rate peak that is a peak appearing transiently in the yaw rate response characteristics that are the vehicle's behavior to a small value. In this embodiment, as the first dynamic component calculation unit 73b, a low-pass filter having a transfer function of a higher-order lag, such as a second-order lag, may be adopted according to the degree of reducing the absolute value of the yaw rate peak to a small value. The converted additional angle Δθs_p thus obtained is output to an adder 76.

The steering angle θs and the converted additional angle Δθs_p are input into the adder 76. The adder 76 calculates the steering-converted angle θs_p by adding up the steering angle θs and the converted additional angle Δθs_p obtained through the first compensation calculation unit 73. Thus, the steering-converted angle θs_p is angle information obtained by performing scale conversion on the steering angle θs so as to turn the steering angle θs into a state variable based on the pinion angle θp. The steering-converted angle θs_p thus obtained is output to the second compensation calculation unit 74.

The vehicle speed V, the steering angle θs, and the steering-converted angle θs_p are input into the second compensation calculation unit 74. The second compensation calculation unit 74 calculates the target pinion angle θp* based on the vehicle speed V, the steering angle θs, and the steering-converted angle θs_p.

Specifically, the second compensation calculation unit 74 has a second constant calculation unit 74a and a second dynamic component calculation unit 74b. The vehicle speed V and the steering angle θs are input into the second constant calculation unit 74a. The vehicle speed V and the steering angle θs that are state variables input here are the same as the state variables that are input into the speed increase ratio calculation unit 70. Thus, the vehicle speed V and the steering angle θs that are state variables are the same state variables as those input into the first constant calculation unit 73a. The second constant calculation unit 74a includes a second constant map that defines the relationship of the vehicle speed V and the steering angle θs with a second constant K2. The second constant calculation unit 74a calculates the second constant K2 based on the map using the vehicle speed V and the steering angle θs as inputs. The second constant map is set, for example, such that the value remains constant relative to the steering angle θs and that the value becomes smaller as the vehicle speed V becomes higher. For the second dynamic component calculation unit 74b that realizes filtering for adjusting a frequency characteristic as phase compensation, the second constant K2 is a value representing a constant of a transfer function that is the characteristics of the filtering. Specifically, the second constant K2 is a cutoff frequency of the transfer function for specifying a frequency that is used as a target in the filtering, and corresponds to a filter constant that is set when a discrete control system is implemented as the second dynamic component calculation unit 74b. The second constant K2 thus obtained is output to the second dynamic component calculation unit 74b.

The steering-converted angle θs_p and the second constant K2 are input into the second dynamic component calculation unit 74b. The second dynamic component calculation unit 74b calculates the target pinion angle θp* based on the steering-converted angle θs_p and the second constant K2. In this embodiment, the second dynamic component calculation unit 74b is formed as a phase lag filter, for example, a low-pass filter, that has a transfer function of a zero-order/first-order, i.e., first-order lag. With the pass frequency set to, for example, a frequency band of a few tens of hertz according to the second constant K2, the second dynamic component calculation unit 74b makes an adjustment to reduce so-called high-frequency noise that is a high-frequency component appearing in the yaw rate response characteristics that are the vehicle's behavior. Thus, the second dynamic component calculation unit 74b performs filtering for reducing noise that appears in a different context from the first dynamic component calculation unit 73b. In this embodiment, as the second dynamic component calculation unit 74b, a low-pass filter having a transfer function of a higher-order lag, such as a second-order lag, may be adopted according to the degree of reducing the noise.

Functions of Angle Information Calculation Unit 71

Of the main functions of the angle information calculation unit 71, the function of adjusting the yaw rate response characteristics that are the vehicle's behavior is realized by the functions of the static component calculation unit 72 and the first compensation calculation unit 73.

Figure 4A:
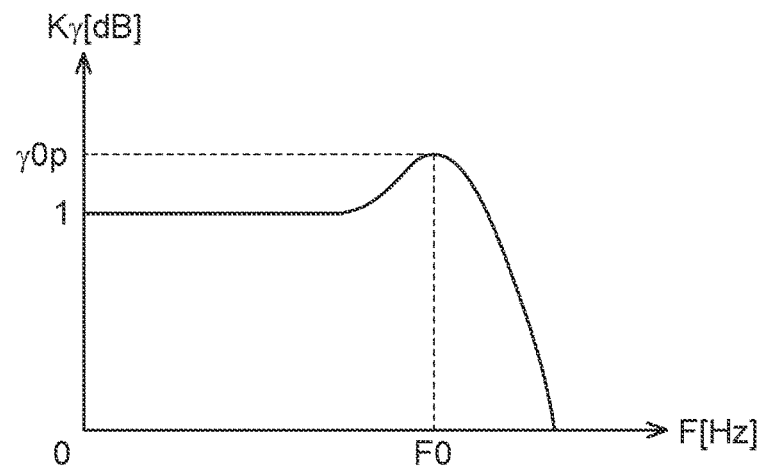
FIG. 4A is a graph illustrating yaw rate response characteristics for the first embodiment.

For example, as shown in FIG. 4A, the yaw rate response characteristics that the vehicle originally has at predetermined vehicle speed V and steering angle θs have a predetermined relationship with the frequency. Here, the abscissa axis represents a frequency F (Hz) and the ordinate axis represents a yaw rate gain Kγ (dB) that is an amplitude ratio of the yaw rate relative to the frequency F. In this case, a peak value showing the magnitude of a peak that appears transiently so as to exceed the value "1" of the yaw rate gain Kγ assumes a peak value γ0p with a frequency F0 as a resonance frequency.

Figure 4B:
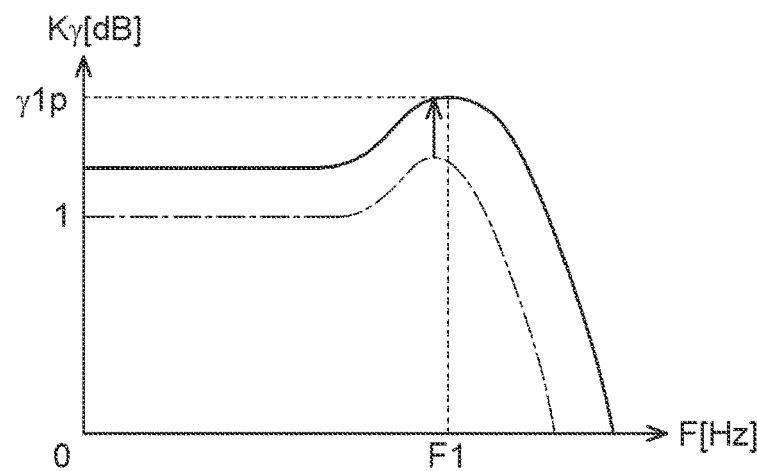
FIG. 4B is a graph illustrating the yaw rate response characteristics for the first embodiment.

As shown in FIG. 4B, as a result of reflecting the speed increase value ΔGsir on the steering angle θs through the function of the static component calculation unit 72, the yaw rate gain Kγ is offset such that the absolute value of the yaw rate gain Kγ becomes larger by the amount according to the speed increase value ΔGsir. Thus, the yaw rate gain Kγ transitions from the characteristic represented by the long dashed short dashed line to the characteristic represented by the solid line. In this case, the peak value of the yaw rate gain Kγ changes from the peak value γ0p to a peak value γ1p with a larger absolute value. A frequency F1 that is a resonance frequency showing the peak value γ1p can change upward and downward relative to the frequency F0. Thus, for the yaw rate response characteristics, the transiently appearing peak value also increases as the responsiveness becomes higher according to the speed increase value ΔGsir.

By contrast, as a result of performing filtering by a low-pass filter having a transfer function of a first-order lag through the function of the first compensation calculation unit 73, the peak value $\gamma 1p$ of the yaw rate gain $K\gamma$ is canceled. Thus, the yaw rate gain $K\gamma$ transitions from the characteristic represented by the long dashed double-short dashed line to the characteristic represented by the solid line. In this case, the cutoff frequency of the low-pass filter is set based on the frequency F1 that is the resonance frequency showing the peak value $\gamma 1p$. Thus, the yaw rate response characteristics are adjusted so as to keep the transiently appearing peak down.

Such a cutoff frequency is set as the first constant K1 through the function of the first constant calculation unit 73a of the first compensation calculation unit 73. The first constant K1 is calculated using the vehicle speed V and the steering angle $\theta s$ that are the same state variables as those used to calculate the speed increase value $\Delta Gsir$. In this case, as a value corresponding to the speed increase value $\Delta Gsir$, the first constant K1 is set to a value associated with the peak value that changes according to the speed increase value $\Delta Gsir$. For example, the first constant K1 is set as a value that further narrows the range of the cutoff frequency as the peak value becomes larger.

Steering Angle Ratio Inverse Varying Control Unit 66

Figure 5:
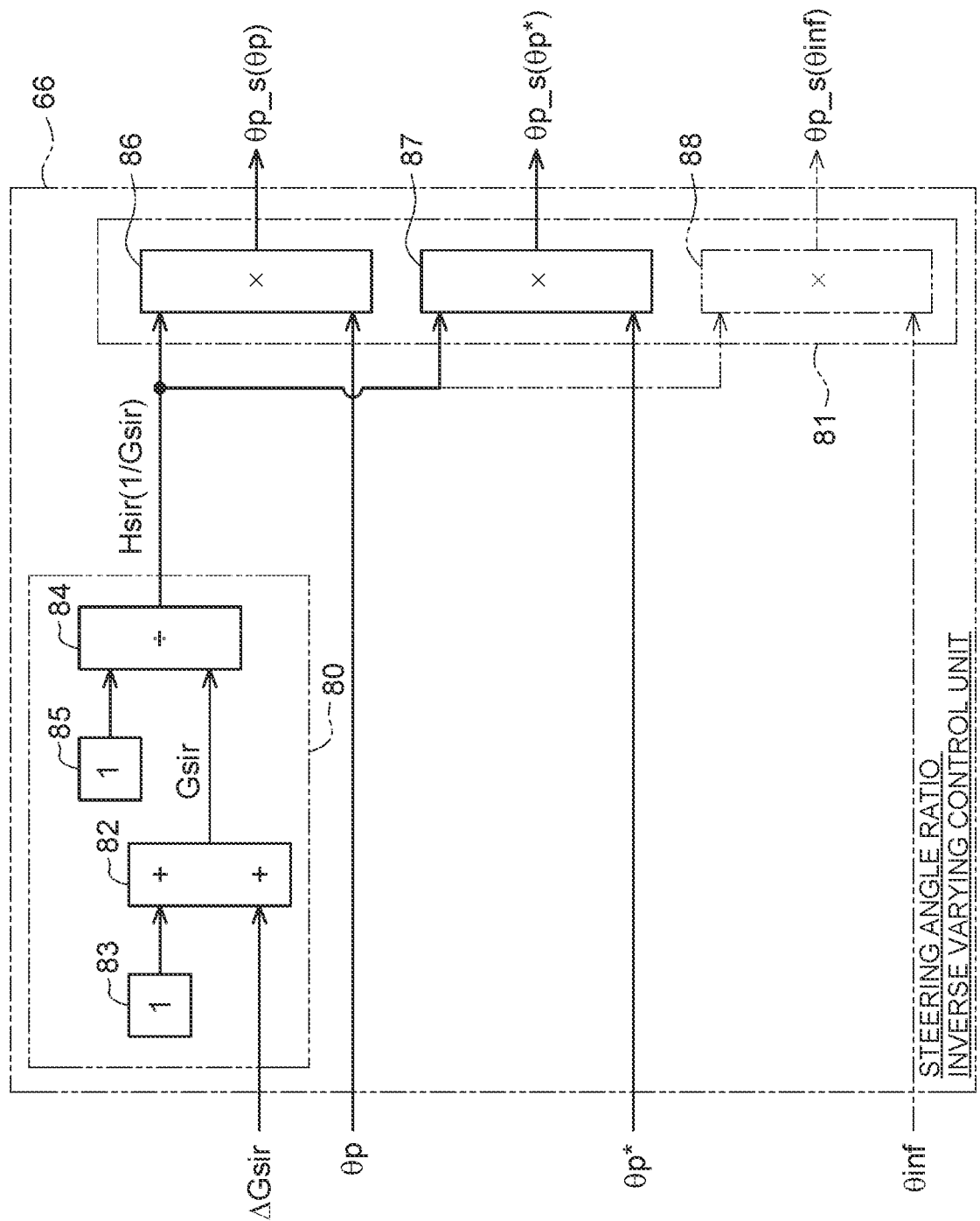
FIG. 5 is a block diagram showing functions of a steering angle ratio inverse varying control unit for the first embodiment.

As shown in FIG. 5, the steering angle ratio inverse varying control unit 66 has a speed increase ratio conversion unit 80 and a turning-converted angle calculation unit 81.

In the speed increase ratio conversion unit 80, the speed increase value $\Delta Gsir$ is input into an adder 82. The adder 82 calculates the speed increase ratio $Gsir$ by adding "1" stored in a storage unit 83 to the speed increase value $\Delta Gsir$. The speed increase ratio $Gsir$ thus obtained is output to a divider 84. The storage unit 83 is a predetermined storage area of a memory (not shown).

The divider 84 calculates an inverse speed increase ratio Hsir by dividing "1" stored in a storage unit 85 by the speed increase ratio $Gsir$. The inverse speed increase ratio Hsir is a reciprocal of the speed increase ratio $Gsir$ (in FIG. 5, "1/Gsir"), and is an index representing the ratio of the change amount of the steering angle $\theta s$ to the change amount of the pinion angle $\theta p$, i.e., the target pinion angle $\theta p^*$. Thus, the inverse speed increase ratio Hsir corresponds to a value obtained with a denominator being the pinion angle $\theta p$, i.e., the target pinion angle $\theta p^*$ and a numerator being the steering angle $\theta s$. The reverse speed increase ratio Hsir thus obtained is output to the turning-converted angle calculation unit 81. The storage unit 85 is a predetermined storage area of a memory (not shown).

In the turning-converted angle calculation unit 81, the pinion angle $\theta p$ and the inverse speed increase ratio Hsir are input into a first multiplier 86. The first multiplier 86 calculates a turning-converted angle $\theta p\_s$ ($\theta p$) for the pinion angle $\theta p$ by multiplying the pinion angle $\theta p$ by the inverse speed increase ratio Hsir. Thus, the turning-converted angle $\theta p\_s$ ($\theta p$) is angle information obtained by performing scale conversion on the pinion angle $\theta p$ so as to turn the pinion angle $\theta p$ into a state variable based on the steering angle $\theta s$. The turning-converted angle $\theta p\_s$ ($\theta p$) thus obtained is output to the steering-side control unit 50, i.e., the target reaction torque calculation unit 52.

In the turning-converted angle calculation unit 81, the target pinion angle $\theta p^*$ and the inverse speed increase ratio Hsir are input into a second multiplier 87. The second multiplier 87 calculates a turning-converted angle $\theta p\_s$ ($\theta p^*$) for the target pinion angle $\theta p^*$ by multiplying the target pinion angle $\theta p^*$ by the inverse speed increase ratio Hsir. Thus, the turning-converted angle $\theta p\_s$ ($\theta p^*$) is angle information obtained by performing scale conversion on the target pinion angle $\theta p^*$ so as to turn the target pinion angle $\theta p^*$ into a state variable based on the steering angle $\theta s$. The turning-converted angle $\theta p\_s$ ($\theta p^*$) thus obtained is output to the steering-side control unit 50, i.e., the target reaction torque calculation unit 52.

Workings of Embodiment

As shown in FIG. 3, the speed increase value $\Delta Gsir$ obtained in relation to the speed increase ratio $Gsir$ is calculated based on the vehicle speed V and the steering angle $\theta s$, and therefore changes in the vehicle speed V and the steering angle $\theta s$ appear as changes in the speed increase ratio $Gsir$, i.e., the speed increase value $\Delta Gsir$. Thus, the speed increase ratio $Gsir$, i.e., the speed increase value $\Delta Gsir$ can be used as an index when calculating the target pinion angle $\theta p^*$ to obtain an appropriate target pinion angle $\theta p^*$ according to the vehicle speed V and the steering angle $\theta s$.

In this case, when reflecting the pinion angle $\theta p$ or the target pinion angle $\theta p^*$ as a state of the turning section 6 in controlling the steering section 4, the speed increase ratio $Gsir$ relating to the speed increase value $\Delta Gsir$ obtained by the speed increase ratio calculation unit 70 can be applied by turning it into a reciprocal.

Specifically, as shown in FIG. 5, in the speed increase ratio conversion unit 80 of the steering angle ratio inverse varying control unit 66, only the value of the speed increase value $\Delta Gsir$ is acquired. In the speed increase ratio conversion unit 80, an easy calculation combining the four arithmetic operations is performed on the acquired speed increase value $\Delta Gsir$ to apply the result as the inverse speed increase ratio Hsir.

Thus, reflecting the pinion angle $\theta p$ or the target pinion angle $\theta p^*$ in controlling the steering section 4 does not require separately providing a calculation unit for a map-based calculation like the speed increase ratio calculation unit 70 that converts the pinion angle $\theta p$ or the target pinion angle $\theta p^*$. Thus, the capacity of the memory that is set in relation to the turning-side control unit 60 can be kept down. This is significant when calculating multiple types of turning-converted angles $\theta p\_s$ relating to the pinion angle $\theta p$ and the target pinion angle $\theta p^*$ as in this embodiment.

Effects of First Embodiment

In this embodiment, the speed increase ratio $Gsir$, i.e., the speed increase value $\Delta Gsir$ can be used as an index when calculating the target pinion angle $\theta p^*$ to obtain an appropriate target pinion angle $\theta p^*$ according to the vehicle speed V and the steering angle $\theta s$. When reflecting the pinion angle $\theta p$ or the target pinion angle $\theta p^*$ as a state of the turning section 6 in controlling the steering section 4, the speed increase value $\Delta Gsir$ can be applied as the inverse speed increase ratio Hsir. Thus, as a method of varying the relationship between the steering angle $\theta s$ and the pinion angle $\theta p$, a useful method using the speed increase ratio $Gsir$ that is the ratio of the change amount of the pinion angle $\theta p$, i.e., the target pinion angle $\theta p^*$ to the change amount of the steering angle $\theta s$ can be proposed.

Figure 4C:
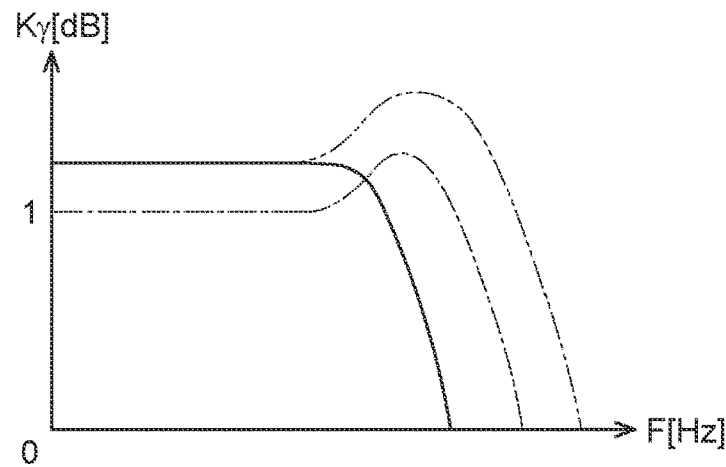
FIG. 4C is a graph illustrating the yaw rate response characteristics for the first embodiment.

In this embodiment, the angle information calculation unit 71 is configured to include the static component calculation unit 72 and the first compensation calculation unit 73. In this case, regarding the yaw rate response characteristics, the responsiveness can be enhanced according to the speed increase value $\Delta Gsir$ as well as the transiently appearing peak value can be cancelled, as described using FIG. 4A to FIG. 4C. Thus, it is possible to adjust the yaw rate response characteristics so as to keep the transiently appearing peak down, without narrowing the range that can be used as the speed increase ratio Gsir.

In this embodiment, the target pinion angle θp* is obtained by adding up the steering angle θs and the final converted additional angle Δθs_p that is obtained by the first dynamic component calculation unit 73b relative to the converted additional angle Δθbs_p. The converted additional angle Δθbs_p is obtained by the static component calculation unit 72 by using the speed increase value ΔGsir corresponding to a value obtained by subtracting the reference value "1" from the speed increase ratio Gsir.

Thus, even when the steering angle θs is converted so as to increase the speed as a result of using the speed increase ratio Gsir, the impact is restricted to the speed increase value ΔGsir of the speed increase ratio. In this case, even when filtering by the first dynamic component calculation unit 73b is performed while the yaw rate response characteristics that the vehicle originally has remain, the peak that appears transiently in the yaw rate response characteristics can be favorably kept down.

In this embodiment, the target pinion angle θp* is obtained by performing filtering by the second dynamic component calculation unit 74b. Thus, noise that appears in a different context from an increase in the peak that appears transiently in the yaw rate response characteristics can be reduced. This is effective for securing stability in controlling the operation of the turning section 6.

Second Embodiment

In the following, a second embodiment of the steering control device will be described. An overlapping description of components etc. that are the same as in the embodiment already described will be omitted by, for example, denoting them by the same reference signs.

In a steering angle ratio varying control unit 67 of this embodiment, the function of the steering angle ratio varying control unit 62 of the first embodiment is changed so as to calculate the target pinion angle θp* using the speed increase ratio Gsir. Accordingly, in a steering angle ratio inverse varying control unit 68 of this embodiment, the function of the steering angle ratio inverse varying control unit 66 of the first embodiment is changed.

Steering Angle Ratio Varying Control Unit 67

Figure 6:
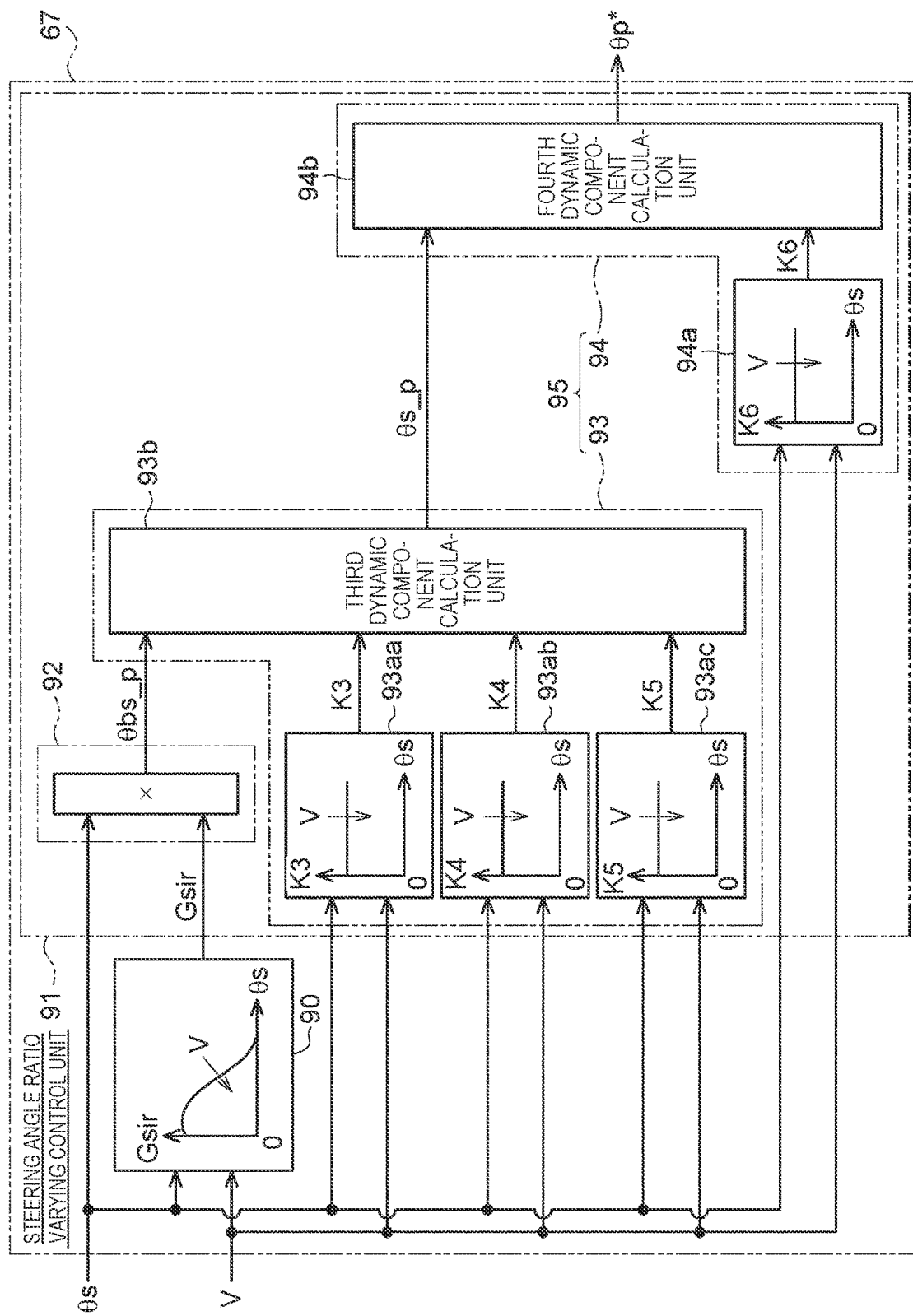
FIG. 6 is a block diagram showing functions of a steering angle ratio varying control unit for a second embodiment.

As shown in FIG. 6, in the steering angle ratio varying control unit 67, the vehicle speed V and the steering angle θs are input into a speed increase ratio calculation unit 90. The speed increase ratio calculation unit 90 includes a speed increase ratio map that defines the relationship of the vehicle speed V and the steering angle θs with the speed increase ratio Gsir. The speed increase ratio calculation unit 90 calculates the speed increase ratio Gsir based on the map using the vehicle speed V and the steering angle θs as inputs. The speed increase ratio map is set, for example, such that the value becomes smaller as the steering angle θs becomes larger and that the value becomes smaller as the vehicle speed V becomes higher. The speed increase ratio Gsir thus obtained is output to an angle information calculation unit 91 and the steering angle ratio inverse varying control unit 68.

In the steering angle ratio varying control unit 67, the vehicle speed V, the steering angle θs, and the speed increase ratio Gsir are input into the angle information calculation unit 91. In the angle information calculation unit 91, the steering angle θs and the speed increase ratio Gsir are input into a static component calculation unit 92. The static component calculation unit 92 is configured as a multiplier, and calculates a converted angle θbs_p as a static component by multiplying the steering angle θs by the speed increase ratio Gsir. The converted angle θbs_p thus obtained is output to a third compensation calculation unit 93 constituting a part of a compensation calculation unit 95 of this embodiment.

In the third compensation calculation unit 93, the vehicle speed V and the steering angle θs are input into each of a third constant calculation unit 93aa, a fourth constant calculation unit 93ab, and a fifth constant calculation unit 93ac. The vehicle speed V and the steering angle θs that are state variables input here are the same state variables as those input into the speed increase ratio calculation unit 90.

Specifically, each of the constant calculation units 93aa, 93ab, 93ac has a constant map that defines the relationship between the vehicle speed V and the steering angle θs with a corresponding one of constants K3, K4, K5. Specifically, the third constant calculation unit 93aa calculates the third constant K3 based on the map using the vehicle speed V and the steering angle θs as inputs. The fourth constant calculation unit 93ab calculates the fourth constant K4 based on the map using the vehicle speed V and the steering angle θs as inputs. The fifth constant calculation unit 93ac calculates the fifth constant K5 based on the map using the vehicle speed V and the steering angle θs as inputs. Each constant map is set, for example, such that the value remains constant relative to the steering angle θs and that the value becomes smaller as the vehicle speed V becomes higher.

For a third dynamic component calculation unit 93b that realizes filtering for adjusting a frequency characteristic as phase compensation, each of the constants K3, K4, K5 is a value showing a constant of a transfer function that is the characteristics of the filtering. Specifically, each of the constants K3, K4, K5 corresponds to a filter constant that is set when a discrete control system is implemented as the third dynamic component calculation unit 93b. The third constant K3 is a cutoff frequency of a transfer function for specifying the frequency used as a target in the filtering, and corresponds to "ωf" in Formula (3) to be described later. The fourth constant K4 is a time constant of the transfer function of the filtering and corresponds to "Tf" in Formula (3) to be described later. The fifth constant K5 is a damping ratio of the transfer function of the filtering and corresponds to "ζf" in Formula (3) to be described later. The constants K3, K4, K5 thus obtained are output to the third dynamic component calculation unit 93b.

In the third compensation calculation unit 93, the converted angle θbs_p and the constants K3, K4, K5 are input into the third dynamic component calculation unit 93b. The third dynamic component calculation unit 93b calculates the steering-converted angle θs_p based on the converted angle θbs_p and the constants K3, K4, K5. In this embodiment, the third dynamic component calculation unit 93b is configured as multiple phase compensation filters composed of a plurality of cascade-connected filters including a second-order/first-order transfer function and further having a first-order/second-order transfer function.

It is assumed, for example, that the yaw rate response characteristics that the vehicle originally has are expressed by the following Formulae (1) and (2) that are defined based on the relationship of the yaw rate with the turning angle of a front wheel.

$$\gamma = G_d Q_v \delta \qquad \text{Formula (1)}$$

-continued $$Q_v = \frac{Ts+1}{\frac{1}{\omega^2}s^2 + \frac{2\zeta}{\omega}s + 1}$$ Formula (2)

In Formula (1), "γ" represents the yaw rate; "Gd" represents the transmission ratio, steering angle ratio, gear ratio, etc. that the vehicle has; "δ" represents the turning angle of the front wheel; and "Qv" represents the transfer function. In Formula (2), "@" represents the natural frequency; "ζ" represents the damping ratio, and "T" represents the time constant. In this case, "Gd" is a static component that is steady, while "Qv" is a dynamic component including a transient characteristic. Thus, as represented by "Qv" in Formula (2), the yaw rate response characteristics that the vehicle originally has have a first-order/second-order transfer function.

On the other hand, for example, the transfer function "Qf" of the third dynamic component calculation unit 93b is defined as the following Formula (3).

$$Q_f = \frac{\frac{T_f s + 1}{\frac{1}{\omega_f^2}s^2 + \frac{2\zeta_f}{\omega_f}s + 1}}{\frac{Ts+1}{\frac{1}{\omega^2}s^2 + \frac{2\zeta}{\omega}s + 1}}$$ Formula (3)

In Formula (3), "of" represents the third constant K3; "Tf" represents the fourth constant K4; and "ζf" represents the fifth constant K5. In this case, "Qf" includes, in the denominator, the first-order/second-order transfer function of "Qv" of Formula (2) described above, and includes, in the numerator, the first-order/second-order transfer function defined by the constants K3, K4, K5 obtained through the constant calculation units 93aa, 93ab, 93ac. In other words, "Qf" includes a second-order/first-order transfer function that is an inverse function obtained by switching the denominator and the numerator of "Qv" in Formula (2) described above.

The third dynamic component calculation unit 93b functions so as to, in the denominator of "Qf," cancel "Qv" that is the first-order/second-order transfer function that the vehicle originally has and, in the numerator of "Qf," replace with the first-order/second-order transfer function defined by the constants K3, K4, K5. In this case, by replacing with the first-order/second-order transfer function defined by the constants K3, K4, K5, the third dynamic component calculation unit 93b makes an adjust to reduce the absolute value of the yaw rate peak that appears transiently in the yaw rate response characteristics to a small value. The steering-converted angle θs_p thus obtained is output to a fourth compensation calculation unit 94 constituting a part of the compensation calculation unit 95 of this embodiment.

The fourth compensation calculation unit 94 has a function corresponding to the second compensation calculation unit 74 of the first embodiment. Specifically, as a function corresponding to the second constant calculation unit 74a of the second compensation calculation unit 74 of the first embodiment, the fourth compensation calculation unit 94 has a sixth constant calculation unit 94a. As with the second constant calculation unit 74a, the vehicle speed V and the steering angle θs are input into the sixth constant calculation unit 94a. Then, as with the second constant calculation unit 74a, the sixth constant calculation unit 94a calculates a sixth constant K6 corresponding to the second constant K2 based on the vehicle speed V and the steering angle θs. The sixth constant K6 thus obtained is output to a fourth dynamic component calculation unit 94b.

As a function corresponding to the second dynamic component calculation unit 74b of the second compensation calculation unit 74 of the first embodiment, the fourth compensation calculation unit 94 has a fourth dynamic component calculation unit 94b. As with the second dynamic component calculation unit 74b, the steering-converted angle θs_p and the sixth constant K6 are input into the fourth dynamic component calculation unit 94b. As with the second dynamic component calculation unit 74b, the fourth dynamic component calculation unit 94b calculates the target pinion angle θp* based on the steering-converted angle θs_p and the sixth constant K6.

Function of Angle Information Calculation Unit 91

Of the main functions of the angle information calculation unit 91, the function of adjusting the yaw rate response characteristics that are the vehicle's behavior is realized by the functions of the static component calculation unit 72 and the first compensation calculation unit 73.

As a result of reflecting the speed increase ratio Gsir on the steering angle θs through the function of the static component calculation unit 92, Formula (1) described above turns into the following Formula (4) defined by replacing "Gd" with "Gf" that is a value corresponding to the speed increase ratio Gsir.

$$\gamma = G_f Q_v \delta$$ Formula (4)

In this case, as in the first embodiment, the yaw rate gain Kγ is offset such that the absolute value of the yaw rate gain Kγ becomes larger by the amount according to the speed increase ratio Gsir.

On the other hand, as a result of performing filtering by the multiple filters having the transfer function of Formula (3) described above through the function of the third compensation calculation unit 93, Formula (4) described above transitions to the following Formulae (5) and (6). Then, as a result of transitioning to the following Formulae (5) and (6), Formula (4) described above turns into the following Formula (7) defined by replacing "Qv" with a transfer function corresponding to the numerator of "Qf."

$$\gamma = G_f Q_v Q_f \delta$$ Formula (5)

$$\gamma = G_f \frac{Ts+1}{\frac{1}{\omega^2}s^2 + \frac{2\zeta}{\omega}s + 1} \cdot \frac{\frac{T_f s + 1}{\frac{1}{\omega_f^2}s^2 + \frac{2\zeta_f}{\omega_f}s + 1}}{\frac{Ts+1}{\frac{1}{\omega^2}s^2 + \frac{2\zeta}{\omega}s + 1}} \delta$$ Formula (6)

$$\gamma = G_f \frac{T_f s + 1}{\frac{1}{\omega_f^2}s^2 + \frac{2\zeta_f}{\omega_f}s + 1} \delta$$ Formula (7)

In this case, "ωf," "ζf," and "Tf" are set as the constants K3, K4, K5 through the functions of the constant calculation units 93aa, 93ab, 93ac of the third compensation calculation unit 93. The constants K3, K4, K5 are calculated using the vehicle speed V and the steering angle θs that are the same state variables as those used to calculate the speed increase ratio Gsir. In this case, as values corresponding to the speed increase ratio Gsir, the constants K3, K4, K5 are set to values associated with the peak value that changes according to the speed increase ratio Gsir. Thus, as in the first embodiment, the yaw rate response characteristics can be adjusted so as to keep the transiently appearing peak down.

Steering Angle Ratio Inverse Varying Control Unit 68

Figure 7:
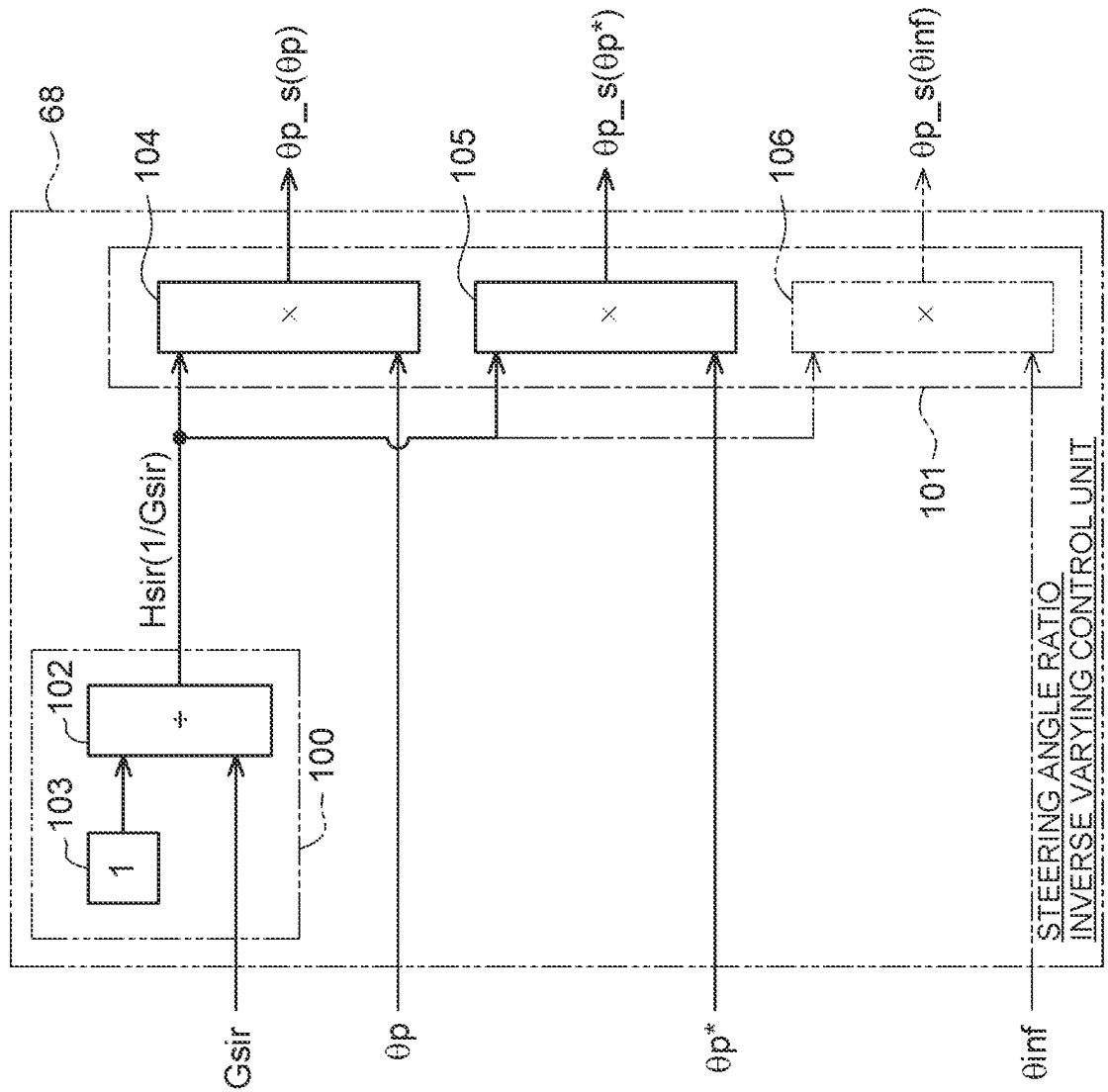
FIG. 7 is a block diagram showing functions of a steering angle ratio inverse varying control unit for the second embodiment.

As shown in FIG. 7, in a speed increase ratio conversion unit 100 of the steering angle ratio inverse varying control unit 68, a divider 102 calculates the inverse speed increase ratio Hsir by dividing "1" stored in a storage unit 103 by the speed increase ratio Gsir, as in the first embodiment. The inverse speed increase ratio Hsir thus obtained is output to a turning-converted angle calculation unit 101. The storage unit 103 is a predetermined storage area of a memory (not shown).

The turning-converted angle calculation unit 101 has a function corresponding to the turning-converted angle calculation unit 81 of the first embodiment. Specifically, as a function corresponding to the first multiplier 86 of the turning-converted angle calculation unit 81 of the first embodiment, the turning-converted angle calculation unit 101 has a third multiplier 104. As with the first multiplier 86, the pinion angle θp and the inverse speed increase ratio Hsir are input into the third multiplier 104. As with the first multiplier 86, the third multiplier 104 calculates a turning-converted angle θp_s (θp) for the pinion angle θp by multiplying the pinion angle θp by the inverse speed increase ratio Hsir. The turning-converted angle θp_s (θp) thus obtained is output to the steering-side control unit 50, i.e., the target reaction torque calculation unit 52.

As a function corresponding to the second multiplier 87 of the turning-converted angle calculation unit 81 of the first embodiment, the turning-converted angle calculation unit 101 has a fourth multiplier 105. As with the second multiplier 87, the target pinion angle θp* and the inverse speed increase ratio Hsir are input into the fourth multiplier 105. As with the second multiplier 87, the fourth multiplier 105 calculates a turning-converted angle θp_s (θp*) for the target pinion angle θp* by multiplying the target pinion angle θp* by the inverse speed increase ratio Hsir. The turning-converted angle θp_s (θp*) thus obtained is output to the steering-side control unit 50, i.e., the target reaction torque calculation unit 52.

Effects of Second Embodiment

The embodiment described above has the following effects in addition to the effects in accordance with the first embodiment.

In this embodiment, the target pinion angle θp* is obtained based on the converted angle θbs_p. The converted angle θbs_p is obtained by the static component calculation unit 92 using the speed increase ratio Gsir.

Thus, when the steering angle θs is converted so as to increase the speed as a result of using the speed increase ratio Gsir, the impact reaches the value of the speed increase ratio Gsir. In this case, filtering by the third dynamic component calculation unit 93b can be performed while the transient characteristic among the yaw rate response characteristics that the vehicle originally has is canceled. Therefore, even when the steering angle θs is converted using the speed increase ratio Gsir, the peak that appears transiently in the yaw rate response characteristics can be favorably kept down.

Other Embodiments

Each of the above embodiments may be changed as follows. The following other embodiments can be combined with one another within such a range that no technical contradiction arises.

In the first embodiment, the speed increase ratio calculation unit 70 should at least use a state variable that changes according to the operation state of at least either the steering device 2 or the vehicle. In this case, the speed increase ratio calculation unit 70 may use only either the vehicle speed V or the steering angle θs, or may use other elements in combination. As a state variable that changes according to the operation state of the steering device 2, a steering speed that is a differential value of the steering angle θs obtained from the steering section 4, or a turning speed that is a differential value of the pinion angle θp or the target pinion angle θp* from the turning section 6 can be adopted. The same applies to the second embodiment. The speed increase ratio calculation unit 90 should at least use a state variable that changes according to the operation state of at least either the steering device 2 or the vehicle. In this case, the speed increase ratio calculation unit 90 may use only either the vehicle speed V or the steering angle θs, or may use other elements in combination.

In the first embodiment, the speed increase ratio map of the speed increase ratio calculation unit 70 can be changed as necessary, for example, by setting it such that the value changes linearly when becoming smaller as the steering angle θs becomes larger, or by setting it such that the value becomes larger as the steering angle θs becomes larger. The same applies to the speed increase ratio map of the speed increase ratio calculation unit 90 of the second embodiment.

In the first embodiment, when calculating the converted additional angle Δθs_p, the first compensation calculation unit 73 should at least use state variables including at least the vehicle speed V and the steering angle θs, i.e., the same state variables as those input into the speed increase ratio calculation unit 70. In this case, the first compensation calculation unit 73 may use other elements in combination along with the vehicle speed V and the steering angle θs. The same applies to the second embodiment. When calculating the steering-converted angle θs_p, the third compensation calculation unit 93 should at least use state variables including at least the vehicle speed V and the steering angle θs, i.e., the same state variables as those input into the speed increase ratio calculation unit 90.

In the first embodiment, when calculating the converted additional angle Δθs_p, the first compensation calculation unit 73 may use only either the vehicle speed V or the steering angle θs or may not use the vehicle speed V and the steering angle θs. In this case, the first compensation calculation unit 73 uses state variables that are different from those input into the speed increase ratio calculation unit 70. The same applies to the second embodiment. When calculating the converted additional angle Δθs_p, the third compensation calculation unit 93 may use only either the vehicle speed V or the steering angle θs or may not use the vehicle speed V and the steering angle θs.

In the first embodiment, when calculating the target pinion angle θp*, the second compensation calculation unit 74 should at least use state variables including at least the vehicle speed V and the steering angle θs, i.e., the same state variables as those input into the speed increase ratio calculation unit 70. In this case, the second compensation calculation unit 74 may use other elements in combination along with the vehicle speed V and the steering angle θs. The same applies to the second embodiment. When calculating the target pinion angle θp*, the fourth compensation calculation unit 94 should at least use state variables including at least the vehicle speed V and the steering angle θs, i.e., the same state variables as those input into the speed increase ratio calculation unit 90.

In the first embodiment, when calculating the target pinion angle θp*, the second compensation calculation unit 74 may use only either the vehicle speed V or the steering angle θs or may not use the vehicle speed V and the steering angle θs. In this case, the second compensation calculation unit 74 uses state variables that are different from those input into the speed increase ratio calculation unit 70. The same applies to the second embodiment. When calculating the target pinion angle θp*, the fourth compensation calculation unit 94 may use only either the vehicle speed V or the steering angle θs or may not use the vehicle speed V and the steering angle θs.

In the first embodiment, the first constant map of the first constant calculation unit 73a can be changed as necessary, for example, by setting it such that the value becomes smaller as the steering angle θs becomes larger. The same applies to the second constant map and the constant maps of the respective constant calculation units 93aa, 93ab, 93ac of the second embodiment.

In the first embodiment, the second compensation calculation unit 74 in the compensation calculation unit 75 may be omitted. In this case, in the angle information calculation unit 71, the first compensation calculation unit 73 may also be omitted, i.e., the compensation calculation unit 75 itself may be omitted. In addition, in the compensation calculation unit 75, the first compensation calculation unit 73 may be omitted while the second compensation calculation unit 74 is retained. The same applies to the second embodiment. The fourth compensation calculation unit 94 of the compensation calculation unit 95 may be omitted, and the third compensation calculation unit 93 may also be omitted, i.e., the compensation calculation unit 95 itself may be omitted. Further, in the compensation calculation unit 95, the third compensation calculation unit 93 may be omitted while the fourth compensation calculation unit 94 is retained.

As indicated by the long dashed double-short dashed line in FIG. 5, in the first embodiment, an intermediate control amount θinf that is an intermediate amount obtained in the process of obtaining the target pinion angle θp* may be input into the turning-converted angle calculation unit 81, other than the pinion angle θp or the target pinion angle θp*. A function of calculating such an intermediate control amount θinf is realized as a function of the steering angle ratio varying control unit 62. In this case, in the turning-converted angle calculation unit 81, a fifth multiplier 88 calculates a turning-converted angle θp_s (θinf) for the intermediate control amount θinf by multiplying the intermediate control amount θinf by the inverse speed increase ratio Hsir. The turning-converted angle θp_s (θinf) thus obtained is output to the steering-side control unit 50, i.e., the target reaction torque calculation unit 52. The same applies to the second embodiment, as indicated by the long dashed double-short dashed line in FIG. 7. An intermediate control amount θinf is input into the turning-converted angle calculation unit 101, other than the pinion angle θp or the target pinion angle θp*. In this case, in the turning-converted angle calculation unit 101, a sixth multiplier 106 calculates a turning-converted angle θp_s (θinf) for the intermediate control amount θinf by multiplying the intermediate control amount θinf by the inverse speed increase ratio Hsir.

In the other embodiment described above, other than information obtained in the process of obtaining the target pinion angle θp*, the intermediate control amount θinf may include information that the turning-side control unit 60 stores as information about the turning section 6, for example, turning limit information showing a turning limit of the turning wheels 5. When a situation arises where the steering wheel 3 reaches its steering limit, the turning limit information can be used to calculate a reaction force for making the driver aware of this situation. In this case, the turning limit information is appropriately used in the target reaction torque calculation unit 52 as angle information obtained by performing scale conversion to turn the turning limit information into a state variable based on the steering angle θs.

In the first embodiment, the turning-converted angle θp_s obtained through the turning-converted angle calculation unit 81 may be output to a vehicle control device that is provided separately from the steering control device 1. As the vehicle control device, for example, a stable travel control device can be assumed that controls a braking amount of a brake mechanism of the vehicle so as to change the yaw rate occurring in the vehicle. Further, as the vehicle control device, a driving assistance control device can be assumed that controls the operation of the turning section 6, i.e., the steering device 2 so as to provide various types of driving assistance for improving the comfort of the vehicle. In addition, as the vehicle control device, a course guidance control device can be assumed that controls the contents displayed on a back guide monitor provided inside a vehicle cabin to provide guidance on an expected course of the vehicle. The same applies to the second embodiment. The turning-converted angle θp_s obtained through the turning-converted angle calculation unit 101 may be output to the vehicle control device described above.

In the first embodiment, one of the adders 86, 87 in the turning-converted angle calculation unit 81 may be omitted. The same applies to the second embodiment, and one of the adders 104, 105 in the turning-converted angle calculation unit 101 may be omitted.

In the first embodiment, the turning-converted angle calculation unit 81 may also be configured with the first multiplier 86 changed into a divider. In this case, the divider calculates the turning-converted angle θp_s (θp) by dividing the pinion angle θp by the speed increase ratio Gsir obtained through the speed increase ratio conversion unit 80. In this case, in the first embodiment, the divider 84 and the storage unit 85 of the speed increase ratio conversion unit 80 can be omitted. The same applies to the second multiplier 87 as well as to the adders 104, 105 of the turning-converted angle calculation unit 101 of the second embodiment. In this case, in the second embodiment, the speed increase ratio conversion unit 100 can be omitted.

In the first embodiment, at least one of the steering angle ratio varying control unit 62 and the steering angle ratio inverse varying control unit 66 may be realized as a function of the steering-side control unit 50. For example, of the steering angle ratio varying control unit 62 and the steering angle ratio inverse varying control unit 66, the steering angle ratio varying control unit 62 may be realized as a function of the steering-side control unit 50. The same applies to the second embodiment. At least one of the steering angle ratio varying control unit 67 and the steering angle ratio inverse varying control unit 68 may be realized as a function of the steering-side control unit 50.

In each of the above embodiments, when calculating the target reaction torque command value Ts*, the target reaction torque calculation unit 52 should at least use a state variable that changes according to the operation state of the steering wheel 3. In this case, the target reaction torque calculation unit 52 may not use the vehicle speed V or the steering torque Th or may use other elements in combination.

In each of the above embodiments, the steering-side control unit 50 may calculate, as the target reaction torque command value Ts*, a value calculated by execution of torque feedback control that adapts the steering torque Th to a target steering torque calculated based on the steering torque Th.

In each of the above embodiments, the steering angle calculation unit 51 may calculate the steering angle θs by taking an amount of twisting of the steering shaft 11 according to the steering torque Th into account and factoring in this amount of twisting in the rotation angle θa through addition, subtraction, etc.

In each of the above embodiments, as the steering angle θs, a detection result of a steering sensor that is provided on the steering shaft 11 to detect the rotation angle of the steering shaft 11 may be used.

In each of the above embodiments, as the turning-side motor 32, for example, a motor that is disposed on the same axis as the rack shaft 22, or a motor that is connected to the rack shaft 22 through the worm and wheel relative to the pinion shaft constituting a part of the rack-and-pinion mechanism may be adopted.

In each of the above embodiments, the steering control device 1 can be formed by a processing circuit including: (1) one or more processors that operate in accordance with a computer program (software); (2) one or more dedicated hardware circuits, such as application-specific integrated circuits (ASICs), that execute at least some of the various processes; or (3) a combination of a processor and a dedicated hardware circuit. The processor includes a CPU and memories, such as an RAM and an ROM, and the memories store program codes or commands configured to cause the CPU to execute processes. Examples of the memories, i.e., non-transitory computer-readable media include all available media that can be accessed by a general-purpose or special-purpose computer.

In each of the above embodiments, the steering device 2 has a link-less structure with the steering section 4 and the turning section 6 mechanically cut off from each other at all times. However, without being limited to this example, the steering device 2 may have a structure in which the steering section 4 and the turning section 6 can be mechanically separated from each other by a clutch. Further, the steering device 2 may have an independently turnable structure that allows the turning section 6 to turn each of the left and right turning wheels 5 independently.

In each of the above embodiments, the turning-converted angle θp_s obtained through the turning-converted angle calculation units 81, 101 may be applied to a function realized by a four-wheel steering device, a rear-wheel steering device, or a device etc. of a vehicle other than the device illustrated in the above embodiments.

What is claimed is:

1. A steering control device that controls, as a control target, at least a turning section of a steering device, the steering device including a steering section that enables steering of a steering wheel of a vehicle and the turning section that has a structure with a power transmission path cut off between the turning section and the steering section and operates to turn a turning wheel of the vehicle,
the steering control device comprising a control unit configured to perform a calculation based on angle information and to control operation of the turning section based on a turning control amount, the angle information being obtained by relating the turning control amount for operating the turning section to a steering angle that is an angle by which the steering wheel is steered, wherein:
the control unit includes a speed increase ratio calculation unit configured to calculate a speed increase ratio based on state variables, and an angle information calculation unit configured to calculate the angle information by converting the steering angle using the speed increase ratio obtained by the speed increase ratio calculation unit;
the speed increase ratio represents a ratio of a change amount of a turning angle that is an angle of the turning wheel to a change amount of the steering angle; and
the state variables change according to an operation state of at least either the steering device or the vehicle equipped with the steering device.

2. The steering control device according to claim 1, wherein:
the angle information calculation unit includes a static component calculation unit and a compensation calculation unit;
the static component calculation unit is configured to calculate a static component as a result of converting the steering angle using the speed increase ratio, the static component being a component reflecting a steady-state characteristic among yaw rate response characteristics that are the vehicle's behavior relating to the angle information; and
the compensation calculation unit is configured to calculate the angle information by performing phase compensation based on the state variables on the static component so as to adjust a transient characteristic among the yaw rate response characteristics that appears in relation to calculation of the static component, the state variables including at least the state variable that the speed increase ratio calculation unit uses for calculation.

3. The steering control device according to claim 2, wherein:
the static component calculation unit is configured to calculate the static component using an amount of speed increase in the speed increase ratio, the amount of speed increase being a difference from a reference value that is one as a ratio of a change amount of a turning angle that is an angle of the turning wheel to a change amount of the steering angle;
the compensation calculation unit is configured as a phase lag filter that, to perform phase lag compensation, has a transfer function that changes based on the state variables including at least the state variable that the speed increase ratio calculation unit uses for calculation; and
the control unit is configured to calculate the turning control amount based on a result obtained by adding up the steering angle and the angle information obtained by the phase lag filter.

4. The steering control device according to claim 2, wherein:
the static component calculation unit is configured to calculate the static component using the speed increase ratio;
the compensation calculation unit is configured as a phase compensation filter that, to perform phase compensation, has a transfer function that changes based on the state variables including at least the state variable that the speed increase ratio calculation unit uses for calculation;

the phase compensation filter is configured so as to include an inverse function obtained by switching a denominator and a numerator of a transfer function representing a transient characteristic among the yaw rate response characteristics; and the control unit is configured to calculate the turning control amount based on the angle information obtained by the phase compensation filter.

5. The steering control device according to claim 2, wherein the compensation calculation unit is configured to further include a phase lag filter that, to perform phase lag compensation of reducing noise that appears in a different context from a transient characteristic among the yaw rate response characteristics that appears in relation to calculation of the static component, has a transfer function that changes based on the state variables including at least the state variable that the speed increase ratio calculation unit uses for calculation.

* * * * *